C. F. OVERLY.
ROTARY MOTOR FOR DRIVING TOOLS.
APPLICATION FILED JAN. 19, 1912.
1,104,071. Patented July 21, 1914.
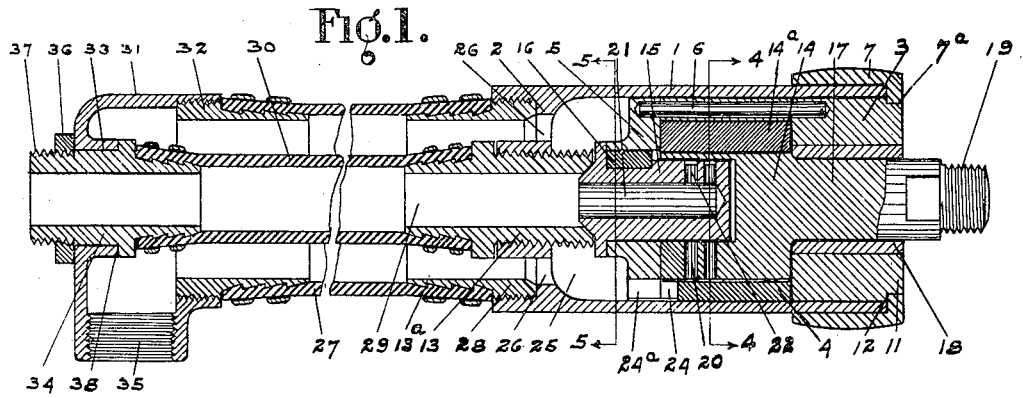
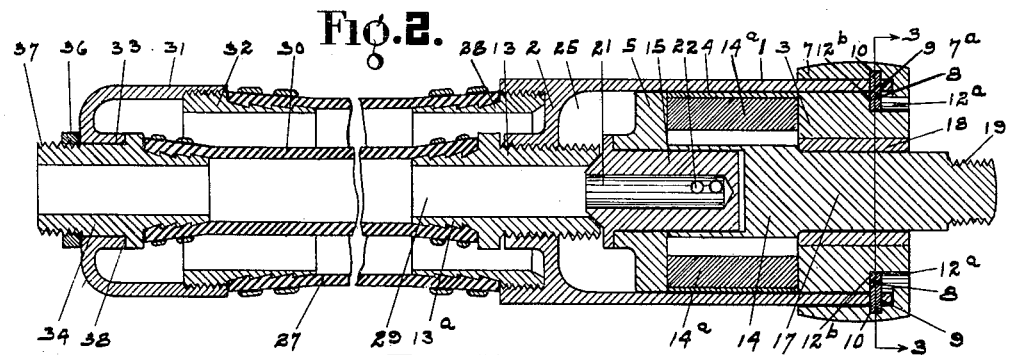
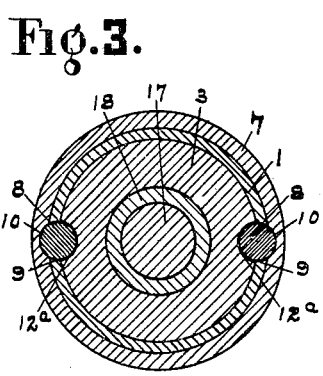
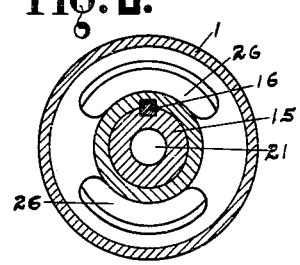
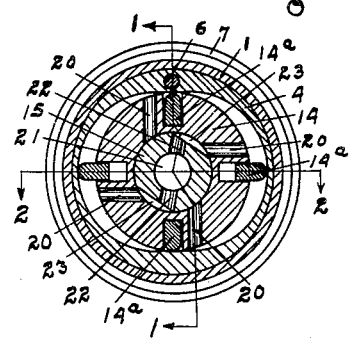
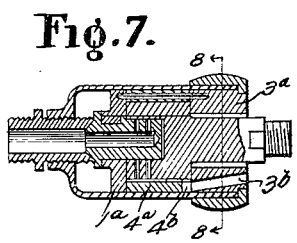
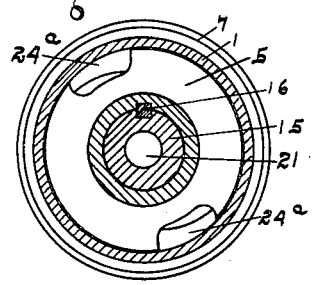
Witnesses
Grover Allgyer
Virgil Baker
Inventor
Charles F. Overly
By Oevey Norton
Attorney

UNITED STATES PATENT OFFICE.

CHARLES F. OVERLY, OF PITTSBURGH, PENNSYLVANIA, ASSIGNOR TO THE LAGONDA MANUFACTURING COMPANY, OF SPRINGFIELD, OHIO, A CORPORATION OF OHIO.

ROTARY MOTOR FOR DRIVING TOOLS.

1,104,071.      Specification of Letters Patent.      Patented July 21, 1914.

Application filed January 19, 1912. Serial No. 672,248.

*To all whom it may concern:*

Be it known that I, CHARLES F. OVERLY, a citizen of the United States, residing at Pittsburgh, in the county of Allegheny and State of Pennsylvania, have invented certain new and useful Improvements in Rotary Motors for Driving Tools, of which the following is a specification, reference being had therein to the accompanying drawings.

My invention relates to rotary motors and more particularly to a motor of this class adapted to drive boiler tube cleaners, although it may be used for other purposes.

The object of my invention is to provide a compact and efficient motor adapted to travel through a tube with the cleaner.

A further object is to provide improved means for assembling the parts so that the motor can be easily taken apart for renewal or repairs.

A further object is to provide means for carrying the exhaust to a suitable place for discharge.

With these and other objects in view my invention consists of the constructions and combinations hereinafter described and set forth in the claims.

Like numerals represent the same parts in the several views.

In the accompanying drawings which form a part of this specification Figure 1 is a longitudinal section on the line 1—1 of Fig. 4. Fig. 2 is a like section on the line 2—2 of Fig. 4. Fig. 3 is a cross-section on the line 3—3 of Fig. 2. Fig. 4 is a cross-section on the line 4—4 of Fig. 1. Fig. 5 is a cross-section on the line 5—5 of Fig. 1 looking in the direction of the arrows, Fig. 6 is a cross-section on the same line of Fig. 1 looking in the opposite direction, Fig. 7 shows a modification and Fig. 8 is a cross-section on the line 8—8 of Fig. 7.

In the drawings 1 represents a casing open at its front end and preferably having an integral head 2 at its rear end. A motor bearing member 3, a motor cylinder 4 and a disk or partition 5 are secured together by dowel-pin 6 and inserted through the open end of the casing. A wearing ring 7 having a flange 7ª is then placed in position on the casing and one or more abutments 8 are inserted from the inner side of the casing through openings 9 in the wall thereof into openings 10 in the ring. The motor bearing member 3 is provided with a reduced portion 11 forming a shoulder 12 and is further provided with grooves 12ª forming shoulders 12ᵇ so that when the disk or partition 5, motor cylinder 4 and motor bearing member 3 are moved forward in the casing the shoulder 12ᵇ on said last named member will rest against the abutments 8 and the shoulder 12 against the flange 7ª of the wearing ring; and said parts are clamped in place against said abutments and flange by a plug 13 screw-threaded in an opening through the head 2. It will be seen there is sufficient clearance between the head 2 and disk or partition 5 to permit the inward and outward movement of the parts to secure them in place as described; and it will also be noted that when the parts are in working position the member 3 holds the abutments 8 in place.

I have shown the motor cylinder of such dimensions that when the rotary motor member 14 is mounted therein it will contact with the walls of the chamber in two places opposite each other forming two oppositely disposed crescent shaped chambers as particularly shown in Fig. 4. Piston blades 14ª seated in recesses in the rotary motor member 14 are adapted to move radially into the crescent shaped chambers in a well known manner.

The disk or partition 5 has a forwardly projecting portion or shaft 15 which I have shown extending through an opening in the disk or partition and secured from rotation therein by a key 16. Said projection or shaft 15 extends within an axial recess in the rotary motor member and forms a bearing to carry the rear end of said member. Said rotary motor member is provided with a forwardly extending portion or shaft 17 journaled in the bearing member 3, a removable bushing 18 being preferably employed; and said shaft is screw-threaded at 19 to attach the tool to be driven.

The motive agent is admitted to the crescent shaped chambers in the rear of the piston blades through inlet ports 20; and the projecting portion or shaft 15 of the disk or partition 5 is provided with an inlet 21 having ports 22 adapted to register with the ports 20 in the rotary motor member, said projecting portion or shaft 15 having transverse slots 23 through which the ports 22 open to the ports 20 as particularly shown in Fig. 4.

Exhaust ports 24 in the cylinder register with ports 24ᵃ through the disk or partition 5 that open into a chamber 25 from which the motive agent is discharged through openings 26 into a hose 27 which is secured to the casing by a coupling 28 as shown.

The plug 13 is provided with a supply opening 29 leading to the inlet 21 and has a rearwardly extending shank 13ᵃ to which a supply hose 30 is secured as shown. A three-way coupling is provided comprising a part 31 having screw-threaded thereto a hose shank 32 secured to the exhaust hose 27 and an opening 33 having a supply hose shank 34 extending therethrough to which the supply hose 30 is secured and is further provided with a screw-threaded opening 35 to which can be attached a discharge conduit leading to any suitable place for delivery. The plug 13 and the coupling 28 can be provided with uniform threads and simultaneously screwed to the casing; or the plug 13 with its hose and shank 34 secured thereto may be first screw-threaded to the casing and then the coupling 28 with its hose and shank 32 secured thereto may be attached to the casing. Having thus secured the double hose to the casing the part 31 of the coupling is then screw-threaded in place and a nut 36 on the screw-threaded extension 37 of the shank 34 is employed to tighten the part 31 against a shoulder 38 on the shank 34. To the screw-threaded end 37 of the shank 34 a supply conduit leading from a suitable source of supply can be secured.

It will be seen the arrangement is such that the exhaust can be carried to a receptacle or any suitable place of delivery; and this is desirable in some cases as for instance when the motor is employed for driving a tube cleaner to clean tubes in a fire tube boiler as it protects the operator from the soot and dust blown from the tube.

Figs. 7 and 8 show a modification in which a motor cylinder 4ᵃ seated in a casing 1ᵃ is provided with exhaust ports 4ᵇ that discharge through ports or openings 3ᵇ in the motor bearing member 3ᵃ.

Having thus described my invention I claim:—

1. In a rotary motor, a casing having an open end, a motor bearing member adapted to be inserted through said open end, an abutment adapted to be inserted in an opening in the wall of said casing from the inner side thereof and form a stop to prevent the outward movement of said bearing member and means to secure said bearing member against said abutment.

2. In a rotary motor, a casing having an open end, a motor bearing member adapted to be inserted through said open end, an abutment adapted to be inserted in an opening in the wall of said casing from the inner side thereof and form a stop to prevent rotary and outward movement of said bearing member and means to clamp said bearing member against said abutment.

3. In a rotary motor, a casing having an open end, a motor bearing member adapted to be inserted through said open end, an abutment adapted to be inserted in an opening in the wall of said casing from the inner side thereof and form a stop to prevent rotary and outward movement of said bearing member, said bearing member being adapted to retain said abutment in place and means to secure said bearing member against said abutment.

4. In a rotary motor, a casing having an open end, a motor bearing member adapted to be inserted through said open end, a wearing ring and means to fix said ring in its relation to said casing, said means also forming a stop to prevent rotary and outward movement of said bearing member.

5. In a rotary motor, a casing having an open end, a wearing ring and an abutment inserted from the inner side of said casing through an opening in the wall thereof into an opening in said ring to fix said ring in place.

6. In a rotary motor, a casing having an open end, a motor bearing member adapted to be inserted through said open end, a wearing ring, an abutment inserted from the inner side of said casing through an opening in the wall thereof into an opening in said ring to fix said ring in place, said abutment also forming a stop to prevent the outward movement of said motor bearing member.

7. In a rotary motor, a casing having an integral supply head at one end and open at its opposite end, a motor bearing member inserted through said open end, a wearing ring, an abutment inserted from the inner side of said casing through an opening in the wall thereof into an opening in said ring to fix said ring in place, said motor bearing member being adapted to retain said abutment in place and means to clamp said bearing member against said abutment.

8. In a rotary motor, a casing having an integral supply head at its rear end and open at its front end, a rotary motor member, a motor cylinder, motor bearing members on opposite sides of said rotary motor member, said cylinder and bearing members adapted to be inserted through said open end of the casing, an abutment adapted to be inserted in an opening in the wall of said casing from the inner side thereof and form a stop to prevent the outward movement of said cylinder and bearing members and means to secure said cylinder and bearing members in place.

9. In a rotary motor, a casing having an integral head at its rear end and open at its front end, a rotary motor member, a motor cylinder, motor bearing members on opposite sides of said rotary motor member secured against rotation to said cylinder, said cylinder and bearing members adapted to be introduced through said open end into the casing, a wearing ring, an abutment inserted from the inner side of said casing through an opening in the wall thereof into an opening in said ring to fix said ring in place, said abutment also forming a stop to prevent the outward movement of said cylinder and bearing member and a screw-plug in an opening in said integral head adapted to clamp said cylinder and bearing members in place.

10. In a rotary motor, a casing having a working chamber, a rotary motor member having a forwardly projecting shaft or journal portion and an axial recess in the rear side thereof with ports extending therefrom to the working chamber, a disk or partition having an opening with a shaft fixed therein projecting into said axial recess to form a bearing, said shaft having ports adapted to register with the ports in said rotary motor member.

11. In a rotary motor, a casing having an open end, a motor bearing member having a shoulder and adapted to be inserted through said open end, a wearing ring having an inwardly extending flange forming an abutment for said shoulder, means applied from within the casing to fix said wearing ring in place and means to secure said bearing member against said flange abutment.

12. In a rotary motor, a casing having an open end, a motor bearing member having a reduced portion forming a shoulder and a groove also forming a shoulder, said bearing member adapted to be inserted through said open end into the casing, a wearing ring having an inwardly extending flange forming an abutment for said first named shoulder, an abutment inserted from the inner side of said casing through an opening in the wall thereof into an opening in said wearing ring to fix said ring in place and form an abutment for said second named shoulder and means to clamp said motor bearing member against said shoulders.

In testimony whereof I have hereunto affixed my signature in the presence of two witnesses.

CHARLES F. OVERLY.

Witnesses:
JAMES H. JOHNSTON,
MARGE M. DANAHY.

---

Copies of this patent may be obtained for five cents each, by addressing the "Commissioner of Patents, Washington, D. C."